US009306861B2

(12) United States Patent
Tsirkin et al.

(10) Patent No.: US 9,306,861 B2
(45) Date of Patent: Apr. 5, 2016

(54) AUTOMATIC PROMISCUOUS FORWARDING FOR A BRIDGE

(71) Applicant: Red Hat Israel, Ltd., Ra'anana (IL)

(72) Inventors: Michael Tsirkin, Ra'anana (IL); Vladislav Yasevich, Merrimack, NH (US)

(73) Assignee: Red Hat Israel, Ltd., Ra'anana (IL)

( * ) Notice: Subject to any disclaimer, the term of this patent is extended or adjusted under 35 U.S.C. 154(b) by 258 days.

(21) Appl. No.: 14/038,442

(22) Filed: Sep. 26, 2013

(65) Prior Publication Data

US 2015/0089037 A1    Mar. 26, 2015

(51) Int. Cl.
G06F 15/173    (2006.01)
H04L 12/823   (2013.01)
H04L 12/46    (2006.01)

(52) U.S. Cl.
CPC .............. *H04L 47/32* (2013.01); *H04L 12/46* (2013.01)

(58) Field of Classification Search
CPC ............ H04L 63/1408; H04L 63/0227; H04L 43/028
USPC .................................................. 709/223–224
See application file for complete search history.

(56) References Cited

U.S. PATENT DOCUMENTS

| | | | |
|---|---|---|---|
| 6,023,563 A | 2/2000 | Shani | |
| 6,693,888 B2 * | 2/2004 | Cafarelli et al. | ............... 370/338 |
| 7,200,145 B1 | 4/2007 | Edsall et al. | |
| 7,616,633 B2 | 11/2009 | Aiken et al. | |
| 7,808,992 B2 | 10/2010 | Homchaudhuri et al. | |
| 2001/0055303 A1 * | 12/2001 | Horton et al. | ................. 370/389 |
| 2002/0016858 A1 * | 2/2002 | Sawada | ............. H04L 29/12018 709/238 |
| 2003/0084321 A1 * | 5/2003 | Tarquini | .............. H04L 63/1458 726/23 |
| 2004/0213237 A1 * | 10/2004 | Yasue et al. | .................... 370/392 |
| 2007/0094643 A1 * | 4/2007 | Anderson | ..................... 717/128 |
| 2008/0155069 A1 * | 6/2008 | Kunhappan et al. | .......... 709/220 |
| 2008/0175246 A1 * | 7/2008 | Kunhappan et al. | .......... 370/392 |
| 2010/0238926 A1 * | 9/2010 | Miyakawa | .................... 370/390 |

(Continued)

OTHER PUBLICATIONS

David Isaac Wolinsky, Yonggang Liu, Pierre St. Juste, Girish Venkatasubramanian and Renato Figueiredo; "On the Design of Scalable, Self-Configuring Virtual Networks;" 2009; University of Florida; Published in the SC'09 Proceedings of The Conference on High Performance Computing Networking, Storage and Analysis Article No. 13; ACM New York, NY USA.

(Continued)

*Primary Examiner* — Duyen Doan
(74) *Attorney, Agent, or Firm* — Haynes and Boone, LLP

(57) ABSTRACT

An example system to disable a promiscuous mode of a network interface includes a plurality of local network interfaces. Each local network interface of the plurality is coupled over a network to one or more remote network interfaces. Each remote network interface is assigned one or more remote network addresses, and the plurality includes a local network interface in a promiscuous mode. The system also includes a bridge module that determines whether a list of all remote network addresses that are coupled to a subset of local network interfaces is known. The subset includes the plurality of local network interfaces excluding the local network interface. When the list of all remote network addresses that are coupled to the subset is determined to be known, the bridge module disables the promiscuous mode of the local network interface and adds all remote network addresses that are coupled to the subset to a filtering table.

20 Claims, 6 Drawing Sheets

(56) References Cited

U.S. PATENT DOCUMENTS

2011/0149960 A1* 6/2011 Fernandez Gutierrez .... 370/390
2012/0230210 A1* 9/2012 Reed ..................... H04L 43/12
　　　　　　　　　　　　　　　　　　　　　　370/252

OTHER PUBLICATIONS

Qunying Sun and Zhiyuan Hu; "Security for Networks Virtual Access of Cloud Computing;" Alcatel-Lucent Shanghai Bell, Co. Ltd. / 2012 Fourth International Conference on Multimedia Information Networking and Security (MINES); Nov. 2-4, 2012; pp. 749-752.

Rui Campos, Ricardo Duarte, Filipe Sousa, Manuel Ricardo and Jose Ruela; "Network Infrastructure Extension Using 802.1 D-Based Wireless Mesh Networks;" Jan. 18, 2010; pp. 67-89; vol. 11; Issue 1; Wireless Communications and Mobile Computing; John Wiley & Sons, Ltd.

* cited by examiner

AUTOMATIC PROMISCUOUS FORWARDING FOR A BRIDGE

FIELD OF DISCLOSURE

The present disclosure generally relates to a computing system, and more particularly to a networked computing system.

BACKGROUND

A network bridge may be used in computer networks to interconnect two local area networks together and separate network segments. A segment may be a section of a network that is separated by bridges, switches, and/or routers. The bridge, also known as a layer 2 switch, is typically a hardware device used to create a connection between two separate computer networks or to divide one network into two networks.

The bridge is a layer 2 device in the Open System Interconnection (OSI) model, meaning that it uses the media access control (MAC) address information to make decisions regarding forwarding packets. The OSI model is a model of communication upon which hardware and software may be developed and connected.

BRIEF SUMMARY

This disclosure relates to networked computing systems. Methods, systems, and techniques for enabling or disabling a promiscuous mode of an interface are disclosed.

According to an embodiment, a system to disable a promiscuous mode of a network interface includes a plurality of local network interfaces. Each local network interface of the plurality is coupled over one or more networks to one or more remote network interfaces. Each remote network interface is assigned one or more remote network addresses. The plurality includes a first local network interface in a promiscuous mode. The system also includes a plurality of filtering tables. Each filtering table of the plurality of filtering tables is coupled to a local network interface of the plurality of local network interfaces. The system further includes a bridge module coupled to the plurality of local network interfaces. The bridge module determines whether a list of all remote network addresses that are coupled to a subset of local network interfaces is known. The subset includes the plurality of local network interfaces excluding the first local network interface. When the list of all remote network addresses that are coupled to the subset is determined to be known, the bridge module disables the promiscuous mode of the first local network interface and adds all of the remote network addresses that are coupled to the subset to a filtering table that is coupled to the first local network interface.

According to another embodiment, a method of disabling a promiscuous mode of a network interface includes identifying a plurality of local network interfaces coupled to a bridge module. Each local network interface of the plurality is coupled over one or more networks to one or more remote network interfaces. Each remote network interface is assigned one or more remote network addresses. The plurality includes a first local network interface in a promiscuous mode. The method also includes determining whether a list of all remote network addresses that are coupled to a subset of local network interfaces of the plurality is known. The subset includes the plurality of local network interfaces excluding the first local network interface. The method further includes when the list of all remote network addresses that are coupled to the subset is determined to be known, disabling the promiscuous mode of the first local network interface and adding all of the remote network addresses that are coupled to the subset to a filtering table that is coupled to the first local network interface.

According to another embodiment, a non-transitory machine-readable medium is provided. The non-transitory machine-readable medium includes a plurality of machine-readable instructions that when executed by one or more processors is adapted to cause the one or more processors to perform a method including: identifying a plurality of local network interfaces coupled to a bridge module, where each local network interface of the plurality is coupled over one or more networks to one or more remote network interfaces, each remote network interface is assigned one or more remote network addresses, and the plurality includes a first local network interface in a promiscuous mode; determining whether a list of all remote network addresses that are coupled to a subset of local network interfaces of the plurality is known, where the subset includes the plurality of local network interfaces excluding the first local network interface; and when the list of all remote network addresses that are coupled to the subset is determined to be known, disabling the promiscuous mode of the first local network interface and adding all of the remote network addresses that are coupled to the subset to a filtering table that is coupled to the first local network interface.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

Figure 1:
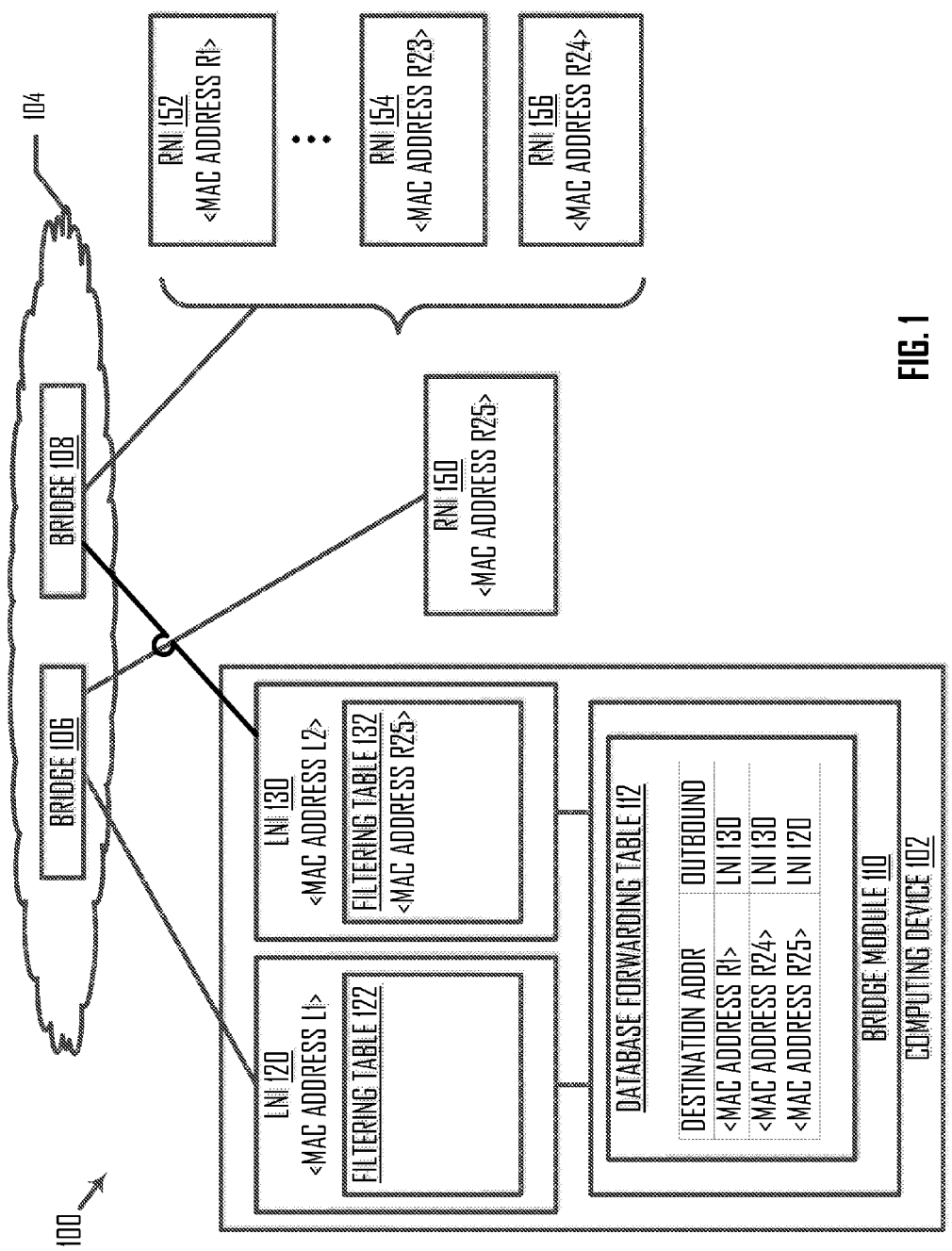
FIG. 1 is a block diagram illustrating a system to disable a promiscuous mode of a network interface, according to an embodiment.

I. Overview
II. Example System Architecture
   A. List of All Remote Network Addresses That Are Coupled to a Local Network Interface
   B. Enable/Disable Promiscuous Mode of a Local Network Interface C. Example Configuration States
 1. List of Remote Network Addresses That Are Coupled to At Least Two Local Network Interfaces is Unknown
 2. List of Remote Network Addresses For All Local Network Interfaces Except One Local Network Interface is Known
 3. List of All Remote Network Addresses That Are Coupled to All Local Network Interfaces is Known
D. Changing Configuration States
III. Unicast and Multicast Addresses
IV. Example System Architecture with a Virtual Network Interface
V. Example Method
VI. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A computing device may be coupled to a network interface to communicate with one or more computing devices over a network. A network interface is typically designed to be coupled to an endpoint device (e.g., work station or a server) and is typically not designed to work with a bridge. A reason that a network interface is typically not used with a bridge is that this may entail providing a dedicated bridge. A network interface is assigned a media access control (MAC) address and typically discards packets that do not have a destination MAC address of the network interface's assigned MAC address. Accordingly, it may be difficult for a bridge executing in a computing device and coupled to the network interfaces to flood incoming packets to other interfaces of the computing device. Flooding a packet may refer to forwarding the packet out to all active interfaces except for the interface on which the packet was received. The specification of the bridge may indicate when to flood a packet.

The present disclosure provides techniques to implement a bridge that is coupled to a plurality of network interfaces. The bridge may be implemented in, for example, software or firmware and is executable on a computing device that is coupled to the plurality of network interfaces. To enable the bridge to flood packets, a promiscuous mode of one or more network interfaces coupled to the bridge may be enabled. A network interface may be in a promiscuous mode or a non-promiscuous mode. Enabling the promiscuous mode of the network interface may allow the discard operation discussed above to be bypassed. In particular, when the network interface is in promiscuous mode, the network interface may accept frames (e.g., Ethernet frames) that are not specifically addressed to the network interface's assigned MAC address. As such, every incoming frame may be processed by the operating system of the computing device, and the bridge may flood incoming packets to other interfaces of the computing device.

It may be inefficient and problematic, however, for a network interface to be in promiscuous mode. For example, promiscuous mode is a special mode that is typically not used in a computing device. As such, the computing device coupled to a network interface that has promiscuous mode enabled may behave differently or incorrectly. For example, enabling promiscuous mode of the network interface may result in noise and dropped packets. Further, the computing device may not implement promiscuous mode efficiently, thus slowing the computing device down.

Further, an incoming packet may be unnecessarily processed. In an example, a bridge is coupled to a plurality of local network interfaces, and the plurality of local network interfaces is coupled over one or more networks to one or more remote network interfaces. A local network interface may refer to a network interface that is included in or locally coupled (e.g., not coupled over a network) to the same computing device on which the bridge is executing. A remote network interface may refer to a network interface that is remote (e.g., coupled over a network) from the local network interface. The remote network interface may be a typical network interface that does not have promiscuous mode enabled. If the bridge receives a packet from a network interface in promiscuous mode and does not know to which local network interface to forward the packet, the bridge may flood the packet. The packet, however, may eventually be dropped when it is received on the other side (e.g., at remote network interfaces) because the destination MAC address of the packet does not match a MAC address assigned to any of the remote network interfaces coupled to the bridge. As such, the bridge may waste processor resources and time in processing the packet only to have it dropped.

It may be desirable to detect a configuration of a computing device executing a bridge (e.g., bridge module) in which flooding of packets is unnecessary. When this configuration is detected, the promiscuous mode of one or more local network interfaces coupled to the bridge may be disabled. It may also be desirable to detect when the configuration of the computing device changes and enable or disable a promiscuous mode of one or more of the local network interfaces accordingly.

The present disclosure provides techniques to enable or disable a promiscuous mode of a network interface. In an embodiment, a system to disable a promiscuous mode of a network interface is provided. The system includes a plurality of local network interfaces, where each local network interface of the plurality is coupled over one or more networks to one or more remote network interfaces. Each remote network interface is assigned one or more remote network addresses, and the plurality includes a first local network interface in a promiscuous mode. The system also includes a plurality of filtering tables, where each filtering table of the plurality of filtering tables is coupled to a local network interface of the plurality of local network interfaces. The system further includes a bridge module coupled to the plurality of local network interfaces, where the bridge module determines whether a list of all remote network addresses that are coupled to a subset of local network interfaces is known. The subset includes the plurality of local network interfaces excluding the first local network interface. When the list of all remote network addresses that are coupled to the subset is determined to be known, the bridge module disables the promiscuous mode of the first local network interface and adds all of the remote network addresses that are coupled to the subset to a filtering table coupled to the first local network interface.

An advantage of disabling the promiscuous mode of a local network interface using the techniques in the present disclosure may be that a standard network interface may be used and no special hardware is needed.

II. Example System Architecture

FIG. 1 is a block diagram 100 illustrating a system to disable a promiscuous mode of a network interface, according to an embodiment. Diagram 100 includes a computing device 102 that includes a bridge module 110 capable of being executed on computing device 102. In an example, bridge module 110 is implemented in software or firmware that is executed on computing device 102 to forward packets from one network to another network.

Bridge module 110 is coupled to local network interface (LNI) 120 and local network interface 130. Each local network interface may have a port (e.g., Internet port), and bridge module 110 may bridge these ports together. A local network interface may be a physical local network interface or a virtual local network interface. Although bridge module 110 is illustrated as being coupled to two local network interfaces, other embodiments in which bridge module 110 is coupled to more than two local network interfaces are within the scope of the present disclosure. Further, the quantity of local network interfaces coupled to bridge module 110 may dynamically change when, for example, another local network interface is added to or removed from the plurality of local network interfaces coupled to bridge module 110.

Local network interfaces 120 and 130 are assigned one or more network addresses. In an example, the network address is a MAC address. In FIG. 1, local network interface 120 is assigned a MAC Address of <MAC Address L1> and is coupled to a filtering table 122. Local network interface 130 is assigned a MAC Address of <MAC Address L2> and is coupled to a filtering table 132.

Computing device 102 is coupled to network 104 via local network interfaces 120 and 130. Network 104 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

A bridge 106 and a bridge 108 may forward packets from one network to another network. Local network interface 130 is coupled via bridge 108 to remote network interfaces 152, 154, and 156. The remote network interfaces may be locally coupled to a computing device (not shown) and may be included in the same computing device or a different computing device relative to each other. Local network interface 130 may send data to and/or receive data from remote network interfaces 152, 154, and 156. The remote network interfaces are each assigned one or more network addresses. Remote network interface 152 is assigned a MAC Address of <MAC Address R1>, remote network interface 154 is assigned a MAC Address of <MAC Address R23>, and remote network interface 156 is assigned a MAC Address of <MAC Address R24>.

Local network interface 120 is coupled via bridge 106 to remote network interface 150. Local network interface 120 may send data to and/or receive data from remote network interface 150. Remote network interface 150 is assigned a MAC Address of <MAC Address R25>. Although local network interface 120 is illustrated as being coupled to one remote network interface and local network interface 130 is illustrated as being coupled to three remote network interfaces, the local network interfaces may be coupled to any number (greater than one) of remote network interfaces. Further, the quantity of remote network interfaces coupled to a local network interface may dynamically change.

Bridge module 110 includes a database forwarding table 112 including a set of mappings from a destination MAC address to an outbound local network interface. In particular, database forwarding table 112 includes a set of mappings from a remote MAC address to a local network interface of computing device 102. Bridge module 110 may receive one or more incoming packets having a destination MAC address and forward based on database forwarding table 112 the one or more incoming packets to at least one local network interface of computing device 102. In this way, bridge module 110 may help to forward packets from one node to another node.

Bridge module 110 may monitor packets on a network and associate source MAC addresses included in a packet received at a local network interface with that local network interface. Bridge module 110 may insert entries into database forwarding table 112 based on the association. Database forwarding table 112 includes entries that map network addresses <MAC Address R1> and <MAC Address R24> to local network interface 130 and network address <MAC Address R25> to local network interface 120. When bridge module 110 receives an incoming packet having a destination MAC address that is not present in database forwarding table 112, bridge module 110 may treat the packet as if it were a broadcast and flood the packet out to all active interfaces except for the interface on which it was received. Bridge module 110 may also flood the packet out to all active interfaces including the interface on which it was received.

A. List of all Remote Network Addresses that are Coupled to a Local Network Interface For each of the plurality of local network interfaces, bridge module 110 may determine whether a list of all remote network addresses that are coupled to the respective local network interface is known. In an embodiment, bridge module 110 receives an indication that a list of all remote network addresses that are coupled to a given local network interface is known. Based on the indication, bridge module 110 may determine whether the list of all remote network addresses that are coupled to the given local network interface is known.

In an example, an administrator (e.g., a human or a software module) may send a request to a management interface (not shown) for the list of all remote network addresses that are coupled to a local network interface. The administrator may receive a list of the remote network addresses coupled to the local network interface and also receive an indication of whether the list is a complete or partial list of all remote network addresses that are coupled to the local network interface. The list may be sent by, for example, a remote computing device (e.g., that is locally coupled to a remote network interface). Bridge module 110 may receive a set of remote network addresses from a remote system to which the set of remote network addresses is assigned.

In another example, the administrator specifies the list of allowed remote network addresses that are coupled to the local network interface. An allowed network address may be a network address included in a packet that will not be discarded by a remote computing device coupled to the local network interface. In such an example, the allowed remote network addresses may serve as the list of all remote network addresses that are coupled to a given local network interface, even if the given local network interface is not coupled to all of the allowed remote network addresses. In another example, bridge module 110 is coupled to a remote bridge module that is similar to bridge module 110 and the remote bridge module 110 sends bridge module 110 a list of network addresses that are remotely coupled to the local network interfaces of bridge module 110.

In another embodiment, bridge module 110 determines how many computing devices or remote network addresses are coupled to a given local network interface. When bridge module 110 has collected that quantity of remote network addresses that is coupled to the given local network interface, bridge module 110 determines that the list of all remote network addresses that are coupled to the given local network interface is known.

Referring to FIG. 1, bridge module 110 may receive a first list of remote network addresses coupled to local network interface 130. The first list may include MAC addresses <MAC Address R1> and <MAC Address R24>. Bridge module 110 may collect the destination MAC addresses included in the first list and insert entries into database forwarding table 112 based on the first list. As illustrated in FIG. 1, bridge module 110 does not have a complete list of remote network addresses that are coupled to local network interface 130 because bridge module 110 does not know about MAC address <MAC Address R23>, which is assigned to remote network interface 154.

Bridge module 110 may receive a second list of remote network addresses coupled to local network interface 120. The second list may include MAC address <MAC Address R25>. Bridge module 110 may collect the destination MAC address included in the second list and insert an entry into database forwarding table 112 based on the second list. As illustrated in FIG. 1, bridge module 110 has a complete list of remote network addresses that are coupled to local network interface 120.

B. Enable/Disable Promiscuous Mode of a Local Network Interface

Bridge module 110 may determine whether to enable or disable the promiscuous mode of a local network interface based on a list of all remote network addresses that are coupled to one or more of the local network interfaces being known. In an embodiment, for each local network interface coupled to bridge module 110, bridge module 110 determines whether a list of all remote network addresses that are coupled to a given subset of local network interfaces is known, where the given subset includes the plurality of local network interfaces excluding the respective local network interface. When the list of all remote network addresses that are coupled to the given subset is determined to be known, bridge module 110 disables the promiscuous mode of the respective local network interface and adds all the remote network addresses that are coupled to the given subset to the filtering table coupled to the respective local network interface. In an example, the local network interface includes the filtering table and bridge module 110 programs into the filtering table all of the remote network addresses that are coupled to the given subset. When all of the remote network addresses that are coupled to a given subset are added to the filtering table, the respective local network interface may filter incoming packets. For example, the local network interface may discard irrelevant incoming packets having destination MAC addresses that do not match the MAC addresses included in the filtering table and the MAC address assigned to the local network interface. As such, when the local network interface receives irrelevant packets, the local network interface may discard these packets. Accordingly, it may be unnecessary for bridge module 110 to process the irrelevant packets and send them out over network 104. This may reduce overhead and allow the local network interface to pass along only relevant packets (e.g., packets having destination MAC addresses that match the MAC addresses included in the filtering table and the MAC address assigned to the local network interface) to bridge module 110 for processing A filtering table may have a maximum size or maximum quantity of network addresses that the filtering table may store. If the quantity of network addresses that are coupled to the subset exceeds the maximum size or maximum quantity of network addresses, the local network interface coupled to the filtering table may remain in promiscuous mode. In an example, bridge module 110 may determine whether adding to the filtering table all of the remote network addresses that are coupled to the subset exceeds a threshold (e.g., maximum size or maximum quantity). If bridge module 110 determines that adding to the filtering table all of the remote network addresses that are coupled to the subset exceeds the threshold, bridge module 110 may decide not to disable the promiscuous mode of the particular local network interface and add all of the remote network addresses that are coupled to the subset to the filtering table.

When bridge module 110 is coupled to N local network interfaces, N different subsets exist. Thus, bridge module 110 may look at each local network interface of the N local network interfaces separately and continue to perform these steps for each of the N different subsets. A quantity of local network interfaces in the given subset depends on how many local network interfaces are coupled to bridge module 110. A quantity of local network interfaces in the given subset may be equal to N−1.

C. Example Configuration States

1. List of Remote Network Addresses that are Coupled to at Least Two Local Network Interfaces is Unknown When a list of remote network addresses that are coupled to at least two local network interfaces of the plurality is unknown, each local network interface of the plurality coupled to bridge module 110 is set to promiscuous mode. In an example, if any local network interfaces of the plurality are in non-promiscuous mode, bridge module 110 may enable the promiscuous mode for these local network interfaces. When a local network interface is coupled to bridge module 110, the local network interface may initially be in promiscuous mode. Bridge module 110 may continuously iterate through each of the local network interfaces to determine whether to disable the promiscuous mode of a local network interface.

Bridge module 110 may disable the promiscuous mode of a local network interface based on knowing a list of all remote network addresses that are coupled to each of the other local network interfaces. In an embodiment, bridge module 110 determines whether a list of all remote network addresses that are coupled to a subset of local network interfaces is known, where the subset includes the plurality of local network interfaces excluding one selected local network interface.

In an example, bridge module 110 selects local network interface 120 and determines whether a list of all remote network addresses that are coupled to each of the other local network interfaces is known. In such an example and in reference to FIG. 1, the subset includes local network interface 130. When the list of all remote network addresses that are coupled to local network interface 130 (the subset) is determined to be known, bridge module 110 disables the promiscuous mode of local network interface 120 (selected local network interface) and adds all of the remote network addresses that are coupled to the subset to filtering table 122. As discussed above in reference to FIG. 1, the list of all remote network addresses that are coupled to local network interface 130 is unknown. Accordingly, the promiscuous mode of local network interface 120 may continue to be enabled (along with the other local network interfaces).

2. List of Remote Network Addresses for all Local Network Interfaces Except One Local Network Interface is Known In the next iteration, for example, bridge module 110 selects local network interface 130 and determines whether a list of all remote network addresses that are coupled to each of the other local network interfaces is known. In keeping with the above example, the subset includes local network interface 120. When the list of all remote network addresses that are coupled to local network interface 120 (the subset) is determined to be known, bridge module 110 disables the promiscuous mode of local network interface 130 (selected local network interface) and adds all of the remote network addresses that are coupled to the subset to filtering table 132. As discussed above in reference to FIG. 1, the list of all remote network addresses that are coupled to local network interface 120 is known. Accordingly, bridge module 110 may disable the promiscuous mode of local network interface 130 and add remote network address <MAC address R25> of the list to filtering table 132.

When the list of all remote network addresses that are coupled to a subset of local network interfaces is known and the subset includes the plurality of local network interfaces coupled to bridge module 110 excluding a given local network interface, the given local network interface may be the only local network interface that has promiscuous mode disabled. The subset of the local network interfaces is in promiscuous mode. In keeping with the above example, local network interface 130 may be the only local network interface coupled to bridge module 110 that has promiscuous mode disabled. As such, when local network interface 130 receives a packet having a destination MAC address that is not present in database forwarding table 112, bridge module 110 may flood the packet out to local network interface 130.

The configuration of computing device 102 may change such that bridge module 110 enables or disables a promiscuous mode of a local network interface coupled to bridge module 110. Bridge module 110 may continuously iterate through each of the local network interfaces to determine whether to enable or disable the promiscuous mode of a local network interface.

3. List of all Remote Network Addresses that are Coupled to all Local Network Interfaces is Known Bridge module 110 is coupled to a plurality of local network interfaces. When bridge module 110 determines that all remote network addresses that are coupled to each of the plurality are known, a promiscuous mode of each local network interface of the plurality may be disabled. Bridge module 110 may disable the promiscuous mode for each local network interface.

Figure 2:
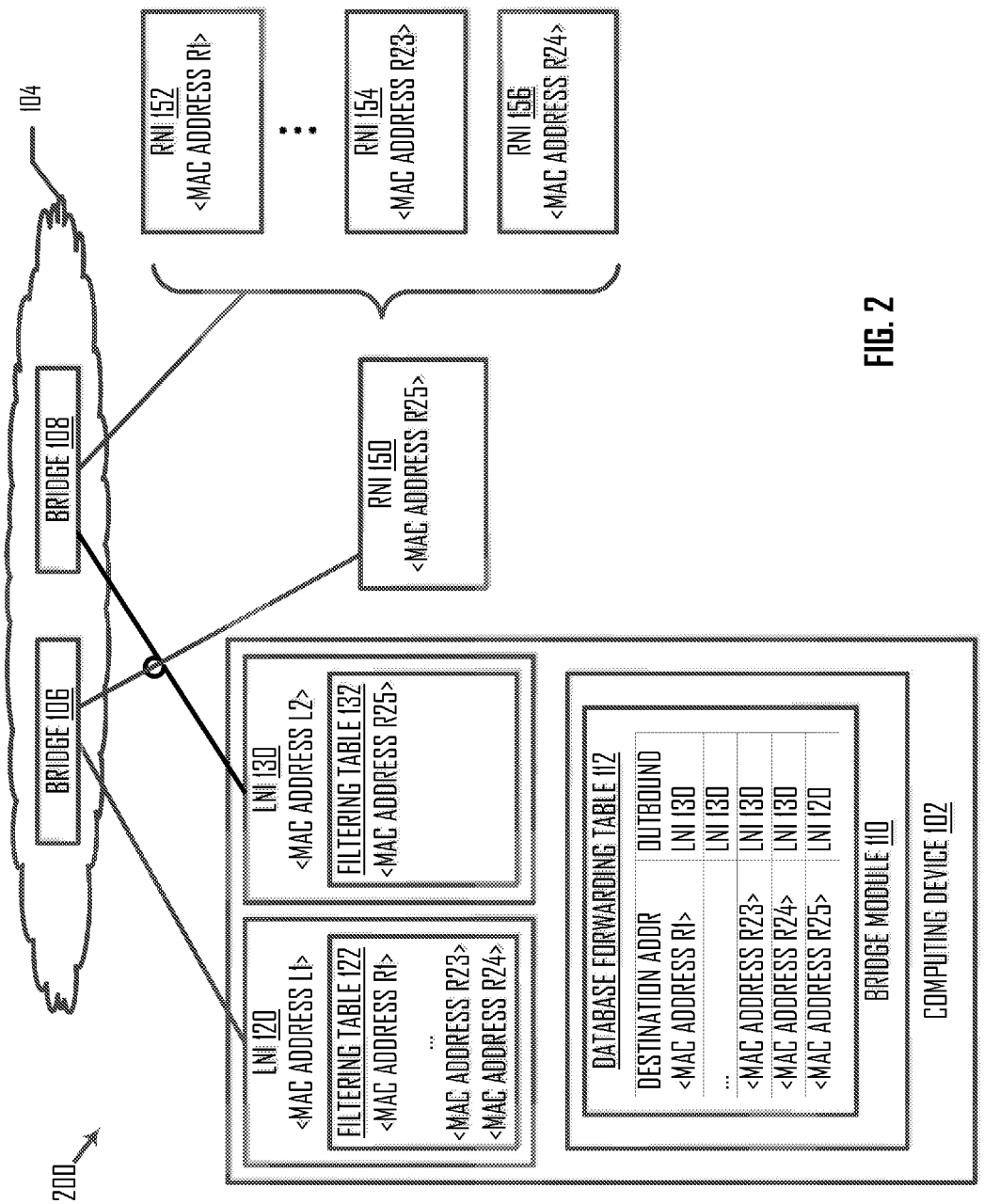
FIG. 2 is a block diagram illustrating a system in which all remote network addresses that are coupled to each local network interface of the plurality are known, according to an embodiment.

FIG. 2 is a block diagram 200 illustrating a system in which all remote network addresses that are coupled to each local network interface of the plurality are known, according to an embodiment. As discussed above in reference to FIG. 1, the complete list of remote network addresses that are coupled to local network interface 130 is unknown, and the complete list of remote network addresses that are coupled to local network interface 120 is known. As such, bridge module 110 may disable the promiscuous mode of local network interface 130 and add remote network address <MAC Address R25> to filtering table 132.

In an example, bridge module 110 receives an indication that a list of all remote network addresses that are coupled to local network interface 130 is known. As such, bridge module 110 may determine that a list of all remote network addresses that are coupled to all local network interfaces is now known. Based on the indication, bridge module 110 disables the promiscuous mode of local network interface 120 and adds all of the remote network addresses that are coupled to local network interface 130 to filtering table 122. Accordingly, a promiscuous mode of each local network interface of the plurality of local network interfaces is disabled.

For example, in FIG. 2, filtering table 122 includes each of the remote network addresses that are coupled to a subset of the plurality of local network interfaces, where the subset includes the plurality of local network interfaces excluding local network interface 120. In particular, filtering table 122 includes MAC addresses <MAC Address R1>, . . . , <MAC Address R23>, and <MAC Address R24>. As such, when local network interface 120 receives a packet having a destination MAC address that does not match a MAC address included in filtering table 122 or the MAC address assigned to local network interface 120, local network interface 120 discards the packet, thus avoiding unnecessary overhead in bridge module 110 processing the packet. Further, database forwarding table 112 includes an additional entry that associates the MAC address of remote network interface 154 <MAC Address R23>, the missing remote network address from FIG. 1, to local network interface 130.

D. Changing Configuration States

As discussed, the configuration of computing device 102 may continue to change such that bridge module 110 enables or disables a promiscuous mode of a local network interface coupled to bridge module 110.

Figure 3:
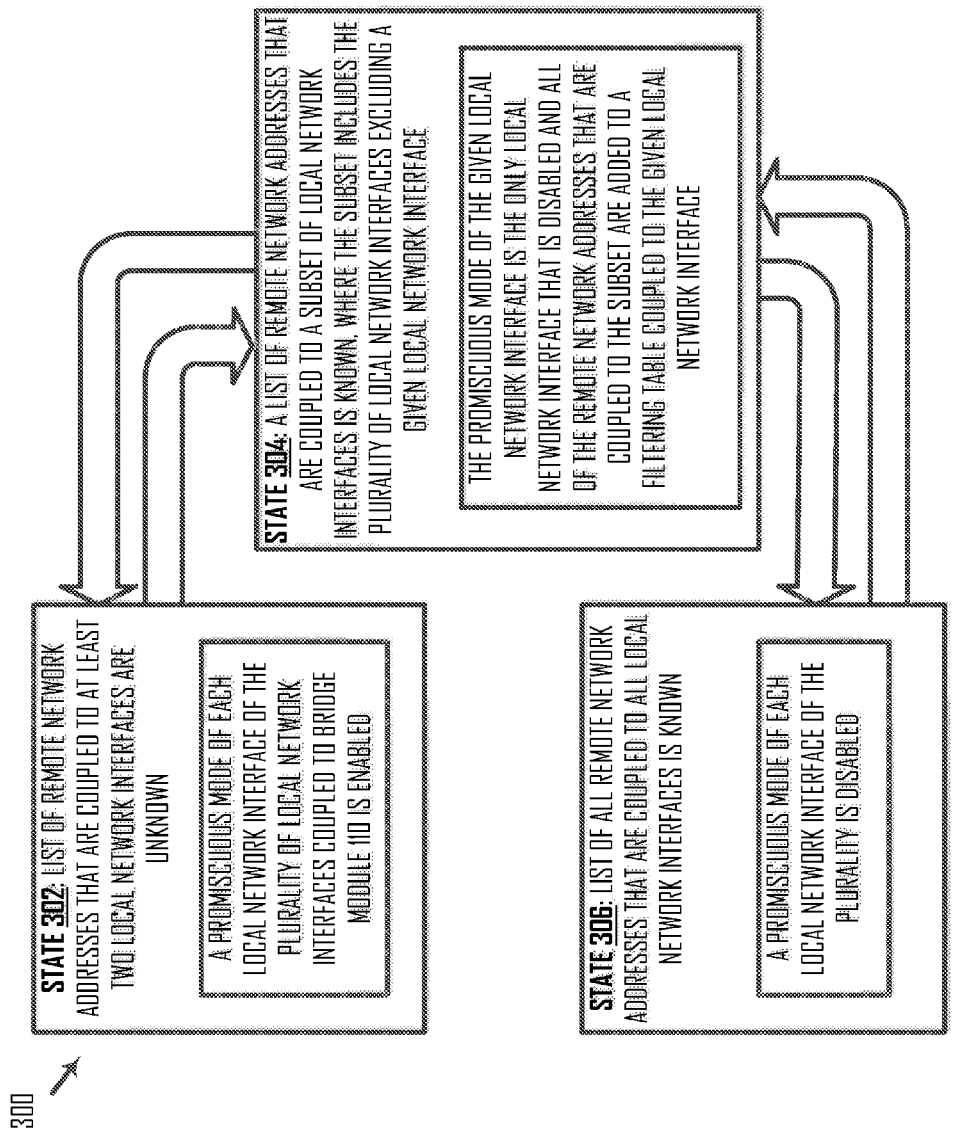
FIG. 3 is a flow diagram illustrating different configuration states of the computing device in which to enable or disable a promiscuous mode of a network interface, according to an embodiment.

FIG. 3 is a flow diagram 300 illustrating different configuration states of the computing device in which to enable or disable a promiscuous mode of a network interface, according to an embodiment. Diagram 300 includes a state 302 in which a list of remote network addresses that are coupled to at least two local network interfaces are unknown. In state 302, a promiscuous mode of each local network interface of the plurality of local network interfaces coupled to bridge module 110 is enabled.

From state 302, a state 304 may occur in which a list of remote network addresses that are coupled to a subset of local network interfaces is known, where the subset includes the plurality of local network interfaces excluding a given local network interface. In state 304, the promiscuous mode of the given local network interface is the only local network interface that is disabled and all of the remote network addresses that are coupled to the subset are added to a filtering table coupled to the given local network interface.

From state 304, state 302 may occur again. When the state transitions from state 304 to state 302, for each local network interface that is in non-promiscuous mode, bridge module 110 may enable the promiscuous mode of the respective local network interface such that each of the local network interfaces are in the promiscuous mode.

From state 304, a state 306 may occur in which a list of all remote network addresses that are coupled to all local network interfaces is known. In state 306, a promiscuous mode of each local network interface of the plurality of local network interfaces is disabled. When the state transitions from state 304 to state 306, for each local network interface that is in promiscuous mode, bridge module 110 may disable the promiscuous mode of the respective local network interface such that each of the local network interfaces are in the non-promiscuous mode. From state 306, a state 304 may occur again.

III. Unicast and Multicast Addresses

In an example, a network interface may include a first promiscuous mode for an address of a first type and a second promiscuous mode for an address of a second type. The first promiscuous mode may be separate and independent of the second promiscuous mode. In such an example, the network interface may have two different promiscuous modes for the address of the first type and the address of the second type. Although the network interface may be described as having a promiscuous mode for two different address types, other embodiments in which the network interface has a promiscuous mode for more than two different address types are within the scope of the present disclosure.

In an embodiment, the address of the first type is a unicast address, and the address of the second type is a multicast address. In an example, one or more bits in a network address (e.g., MAC address) may indicate whether the network address is of the first address type or the second address type. Similarly, a unicast packet may be distinguished from a multicast packet by looking at the applicable one or more bits in the destination MAC address of the packet. The promiscuous mode of the network interface may include a promiscuous mode for unicast addresses and a promiscuous mode for multicast addresses.

The network interface may support each of the address types separately, and the address types may have separate address spaces. In an example, bridge module 110 determines whether a list of all unicast remote network addresses that are coupled to a subset of local network interfaces is known. When the list of all unicast remote network addresses that are coupled to the subset is determined to be known, bridge module 110 may disable the promiscuous mode of the network interface for unicast packets. The promiscuous mode of the network interface for multicast packets may be enabled or disabled.

In another example, bridge module 110 determines whether a list of all multicast remote network addresses that are coupled to a subset of local network interfaces is known. When the list of all multicast remote network addresses that are coupled to the subset is determined to be known, bridge module 110 may disable the promiscuous mode of the network interface for multicast packets. The promiscuous mode of the network interface for unicast packets may be enabled or disabled.

The promiscuous mode of the network interface for unicast packets and multicast packets may be enabled and disabled independent from each other. For example, bridge module 110 may enable promiscuous mode for unicast packets and disable promiscuous mode for multicast packets. In another example, bridge module 110 may disable promiscuous mode for unicast packets and enable promiscuous mode for multicast packets. In another example, bridge module 110 may disable promiscuous mode for both unicast and multicast packets. In another example, the bridge module 110 may enable promiscuous mode for both unicast and multicast packets.

IV. Example System Architecture with a Virtual Network Interface

Figure 4:
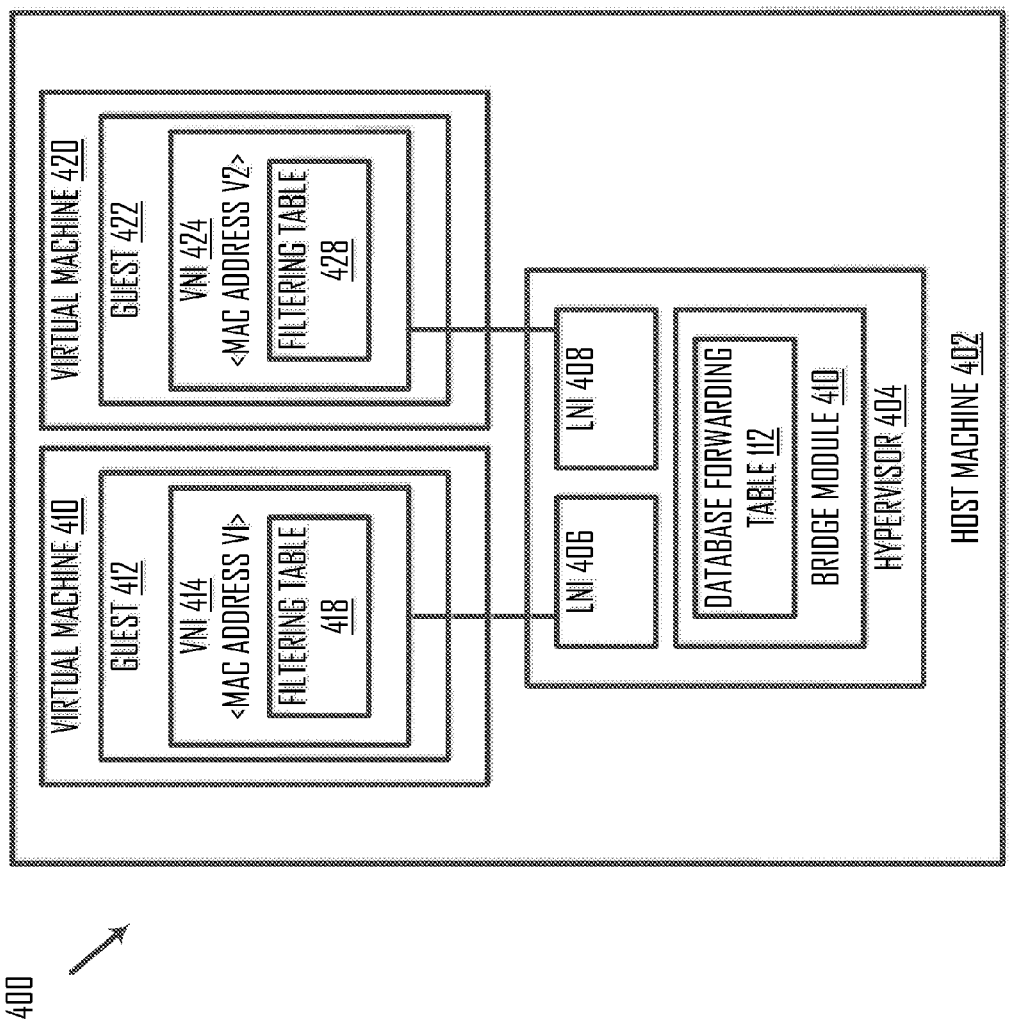
FIG. 4 is a block diagram illustrating a system to disable a promiscuous mode of a network interface, according to an embodiment.

In an embodiment, one or more local network interfaces of the plurality of local network interfaces coupled to bridge module 110 may be a virtual network interface. FIG. 4 is a block diagram 400 illustrating a system to disable a promiscuous mode of a virtual network interface, according to an embodiment.

Diagram 400 includes a host machine 402. Computing device 102 may serve as host machine 402. Host machine 402 may run a virtual machine (VM) 410 and VM 420 that each runs applications and services. A VM is a portion of software that, when executed on appropriate hardware, creates an environment allowing the virtualization of certain functionality of a physical computer system. A VM may function as a self-contained platform, running its own operating system (OS) and software applications (processes). The host machine allocates a certain amount of the host's resources to each of the VMs. Each VM may use the allocated resources to execute applications, including operating systems known as guest operating systems.

VM 410 includes a guest 412 and a virtual network interface (VNI) 414, and VM 420 includes a guest 422 and a VNI 424. A VM running on a host machine may run a guest operating system (OS) that may be different from another guest OS system running on the host machine and may also be different from the host OS running on the host machine. The host or guest OS may include, for example, MICROSOFT® WINDOWS®, LINUX®, SOLARIS®, and MAC® OS. Trademarks are the property of their respective owners. One or more applications may run on each guest operating system (not shown).

Host machine 402 includes a hypervisor 404 that virtualizes the underlying hardware of the host machine or emulates hardware devices, making the use of the virtual machine transparent to the guest OS. Typically, the hypervisor manages allocation and virtualization of computer resources and performs context switching, as may be necessary, to cycle between various VMs.

Hypervisor 404 includes bridge module 410, which is coupled to remote virtual network interface 414 via local network interface 406 and is coupled to remote virtual network interface 424 via local network interface 408. Remote virtual network interface 414 is coupled to a filtering table 418, and remote virtual network interface 424 is coupled to a filtering table 418. Host machine 402 may include a physical network interface that is coupled to local network interfaces 406 and 408. Local network interfaces 406 and 408 may be implemented in software and flood packets to the physical network interface coupled to host machine 402.

VM 410 may have a list of (all or some) remote network addresses that are coupled to VM 410, and VM 420 may have a list of (all or some) remote network addresses that are coupled to VM 420. VMs 410 and 420 may pass these lists onto hypervisor 404 so that it knows the remote network addresses that are coupled to these VMs. In an example, bridge module 110 may select local network interface 406 and determine whether a list of all remote network addresses that are coupled to local network interface 408 (a subset of local network interfaces) is known, where the subset includes the plurality of local network interfaces excluding the selected local network interface. When the list of all remote network addresses that are coupled to the subset is determined to be known, bridge module 110 disables the promiscuous mode of local network interface 406 and adds all of the remote network addresses that are coupled to local network interface 408 to filtering table 416.

Hypervisor 404 may receive a packet from a VM and look up in the filtering table the destination MAC address of the packet. Hypervisor 404 may forward the packet along to the other VMs based on the look up. If the destination MAC address is in a filtering table, hypervisor 140 may forward to the appropriate VM as specified in the entry of the filtering table. If the destination MAC address is not in any of the filtering tables, hypervisor 404 may flood the packet to the VMs.

In an example, in FIG. 4, the list of remote network interfaces coupled to local network interface 406 of bridge module 110 includes VNI 414. Therefore, when VNI 414 is in a promiscuous mode, a list of all remote network addresses coupled to VNI 414 is unknown. Similarly, the list of remote network interfaces coupled to local network interface 408 of bridge module 110 includes VNI 424. When VNI 424 is in a promiscuous mode, a list of all remote network addresses coupled to VNI 424 is unknown. Further, when VNI 414 is not in a promiscuous mode, the list of all remote network addresses coupled to VNI 414 is known to include the contents of filtering table 418. Similarly, when VNI 424 is not in a promiscuous mode, the list of all remote network addresses coupled to VNI 424 is known to include the contents of filtering table 428.

As discussed above and further emphasized here, FIGS. 1-4 are merely examples, which should not unduly limit the scope of the claims.

V. Example Method

Figure 5:
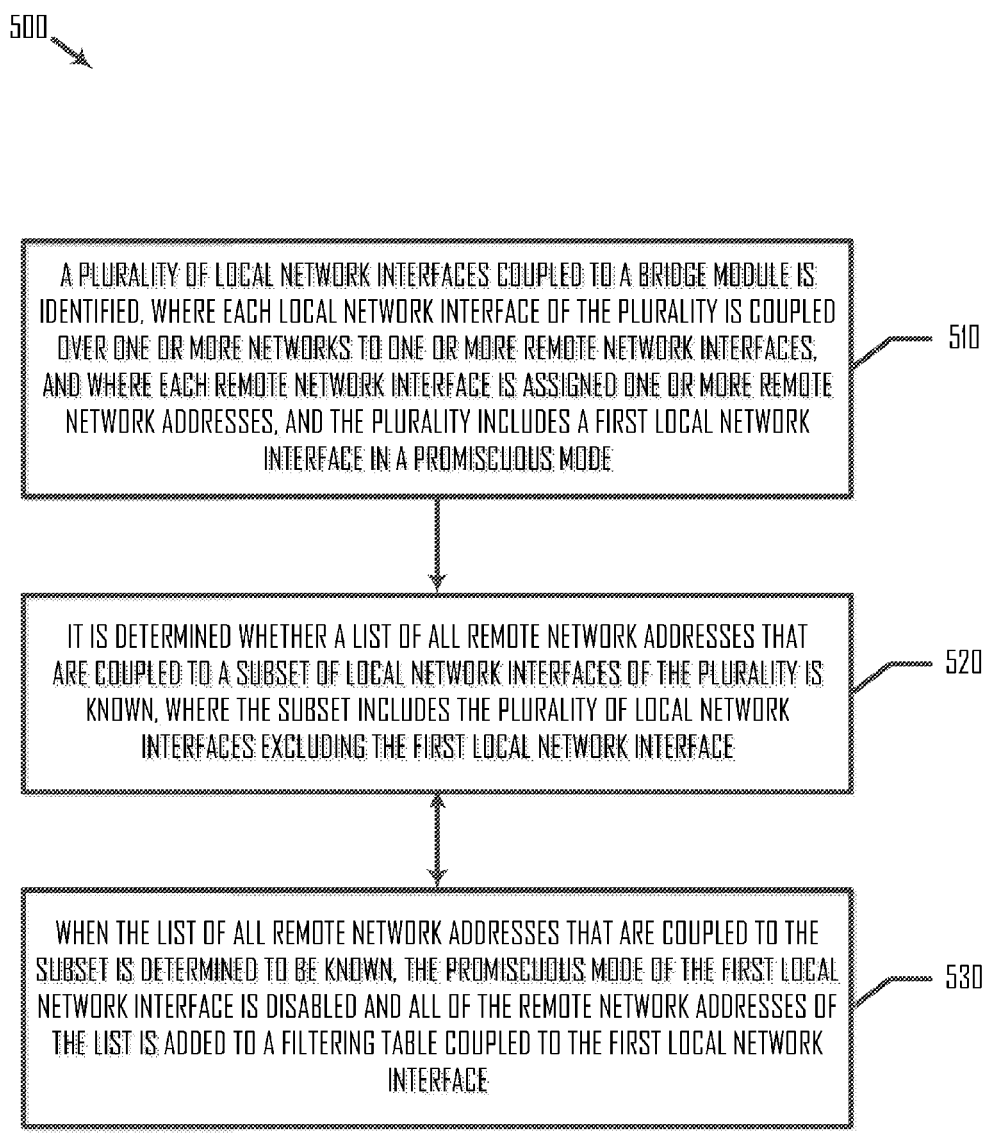
FIG. 5 is a flowchart illustrating a method of disabling a promiscuous mode of a network interface, according to an embodiment.

FIG. 5 is a flowchart illustrating a method of disabling a promiscuous mode of a network interface, according to an embodiment. Method 500 is not meant to be limiting and may be used in other applications.

Method 500 includes steps 510-530. In a step 510, a plurality of local network interfaces coupled to a bridge module is identified, where each local network interface of the plurality is coupled over one or more networks to one or more remote network interfaces, and where each remote network interface is assigned one or more remote network addresses, and the plurality includes a first local network interface in a promiscuous mode. In an example, bridge module 110 identifies a plurality of local network interfaces coupled to the bridge module, where each local network interface of the plurality is coupled over one or more networks to one or more remote network interfaces, and where each remote network interface is assigned one or more remote network addresses, and the plurality includes a first local network interface in a promiscuous mode.

In a step 520, it is determined whether a list of all remote network addresses that are coupled to a subset of local network interfaces of the plurality is known, where the subset includes the plurality of local network interfaces excluding the first local network interface. In an example, bridge module 110 determines whether a list of all remote network addresses that are coupled to a subset of local network interfaces of the plurality is known, where the subset includes the plurality of local network interfaces excluding the first local network interface.

In a step 530, when the list of all remote network addresses that are coupled to the subset is determined to be known, the promiscuous mode of the first local network interface is disabled and all of the remote network addresses that are coupled to the subset is added to a filtering table that is coupled to the first local network interface. In an example, when the list of all remote network addresses that are coupled to the subset is determined to be known, bridge module 110 disables the promiscuous mode of the first local network interface and adds all of the remote network addresses that are coupled to the subset to a filtering table that is coupled to the first local network interface.

It is also understood that additional method steps may be performed before, during, or after steps 510-530 discussed above. It is also understood that one or more of the steps of method 500 described herein may be omitted, combined, or performed in a different sequence as desired.

VI. Example Computing System

Figure 6:
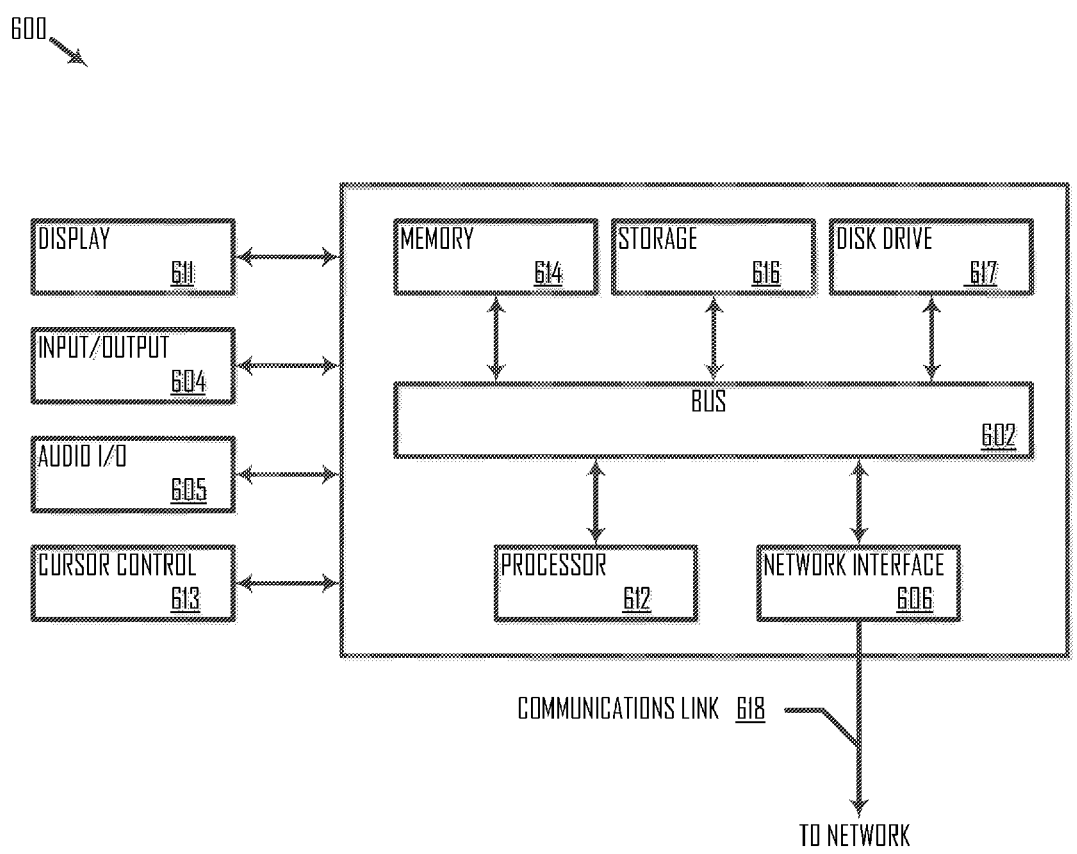
FIG. 6 is a block diagram of an electronic system suitable for implementing one or more embodiments of the present disclosure.

FIG. 6 is a block diagram of a computer system 600 suitable for implementing one or more embodiments of the present disclosure. In various implementations, computing device 102 may include one or more processors. Computing device 102 may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a micro-controller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system to disable a promiscuous mode of a network interface, the system comprising:
   a plurality of local network interfaces, wherein each local network interface of the plurality is coupled over one or more networks to one or more remote network interfaces, and
   wherein each remote network interface is assigned one or more remote network addresses, and the plurality of local network interfaces includes a first local network interface in a promiscuous mode;
   a plurality of filtering tables stored in a memory, wherein each filtering table of the plurality of filtering tables is coupled to a local network interface of the plurality of local network interfaces; and
   a bridge module coupled to the plurality of local network interfaces, wherein the bridge module determines whether a list of all remote network addresses that are coupled to a subset of local network interfaces is known, wherein the subset includes the plurality of local network interfaces excluding the first local network interface, and
   wherein when the list of all remote network addresses that are coupled to the subset is determined to be known, the bridge module disables the promiscuous mode of the first local network interface and adds all of the remote network addresses that are coupled to the subset to a filtering table that is coupled to the first local network interface.

2. The system of claim 1, wherein the bridge module receives an indication that a list of all remote network addresses that are coupled to a given local network interface is known and determines, based on the indication, whether the list of all remote network addresses that are coupled to the given local network interface is known.

3. The system of claim 1, wherein the bridge module determines that the list of all remote network addresses that are coupled to the subset is known, wherein the plurality includes a second local network interface in a promiscuous mode, wherein the bridge module determines whether a second list of all remote network addresses that are coupled to a second subset of local network interfaces is known, wherein the second subset includes the plurality of local network interfaces excluding the second local network interface,
   wherein when the second list of all remote network addresses that are coupled to the second subset is determined to be known, the bridge module disables the promiscuous mode of the second local network interface and adds all of the remote network addresses of the second list to a filtering table coupled to the second local network interface,
   wherein when the bridge module determines that the second list of all remote network addresses that are coupled to the second subset is known, a promiscuous mode of each local network interface of the plurality is disabled,
   wherein after the bridge module determines that the second list is known, the bridge module receives an indication that a list of all remote network addresses that are coupled to a third local network interface of the plurality is unknown,
   wherein based on the indication, if the third local network interface is in a promiscuous mode, the bridge module disables the promiscuous mode of the third local network interface, identifies a third list of all remote network addresses that are coupled to a third subset of local network interfaces, and adds all of the remote network addresses of the third list to a filtering table coupled to the third local network interface,
   wherein the third subset includes the plurality of local network interfaces excluding the third local network interface, and
   wherein based on the indication, for each local network interface of the third subset, the bridge module enables a promiscuous mode of the respective local network interface.

4. The system of claim 3, wherein the second local network interface is different from the third local network interface, and wherein the third local network interface is added to the plurality of local network interfaces coupled to the bridge module.

5. The system of claim 3, wherein the second local network interface is the third local network interface.

6. The system of claim 3, wherein the bridge module receives a second indication that a list of all remote network addresses that are coupled to a given local network interface of the plurality is unknown, wherein the given local network interface is different from the third local network interface,
   wherein based on the second indication, for each local network interface of the plurality that has promiscuous mode disabled, the bridge module enables a promiscuous mode of the respective local network interface.

7. The system of claim 1, wherein the promiscuous mode is a promiscuous mode for an address of a first type or a promiscuous mode for an address of a second type.

8. The system of claim 7, wherein the address of the first type is a unicast address and the address of the second type is a multicast address.

9. The system of claim 1, wherein the remote network addresses are media access control (MAC) addresses.

10. The system of claim 1, wherein when any remote network interface coupled to a given local network interface is in a promiscuous mode, a list of all remote network addresses coupled to the given local network interface is unknown, and when all remote network interfaces coupled to the given local network interface are not in a promiscuous mode, the list of all remote network addresses coupled to the given local network interface is known.

11. The method of claim 1, wherein a set of remote network addresses are received from a remote system to which the set of remote network addresses is assigned.

12. The system of claim 1, wherein a filtering table stores a maximum quantity of network addresses, and when a quantity of network addresses that are coupled to the subset exceeds the maximum quantity of network address, a local network interface coupled to the filtering table remains in promiscuous mode.

13. A method of disabling a promiscuous mode of a network interface, the method comprising:
identifying a plurality of local network interfaces coupled to a bridge module, wherein each local network interface of the plurality of local network interfaces is coupled over one or more networks to one or more remote network interfaces, and
wherein each remote network interface is assigned one or more remote network addresses, and the plurality includes a first local network interface in a promiscuous mode;
determining whether a list of all remote network addresses that are coupled to a subset of local network interfaces of the plurality is known, wherein the subset includes the plurality of local network interfaces excluding the first local network interface; and
when the list of all remote network addresses that are coupled to the subset is determined to be known, disabling the promiscuous mode of the first local network interface and adding all of the remote network addresses that are coupled to the subset to a filtering table that is coupled to the first local network interface.

14. The method of claim 13, further comprising:
determining whether a second list of all remote network addresses that are coupled to a second subset of local network interfaces of the plurality is known,
wherein the plurality includes a second local network interface in a promiscuous mode, and wherein the second subset includes the plurality of local network interfaces excluding the second local network interface; and
when the second list of all remote network addresses that are coupled to the second subset is determined to be known, disabling the promiscuous mode of the second local network interface and adding all of the remote network addresses of the second list to a filtering table coupled to the second local network interface.

15. The method of claim 14, further comprising:
determining that the first list of all remote network addresses that are coupled to the first subset is determined to be known; and
determining that the second list of all remote network addresses that are coupled to the second subset is determined to be unknown,
wherein after the first list is determined to be known and the second list is determined to be unknown, the first local network interface is the only local network interface of the plurality that has promiscuous mode disabled.

16. The method of claim 15, further comprising:
receiving an indication that the first list of all remote network addresses that are coupled to the first subset is unknown; and
based on the indication, enabling the promiscuous mode of the first local network interface.

17. The method of claim 13, wherein the promiscuous mode includes a first promiscuous mode for unicast addresses and a second promiscuous mode for multicast addresses.

18. The method of claim 13, wherein the remote network addresses are media access control (MAC) addresses.

19. The method of claim 13, wherein one or more local network interfaces of the plurality of local network interfaces is coupled to a virtual network interface.

20. A non-transitory machine-readable medium comprising a plurality of machine-readable instructions that when executed by one or more processors is adapted to cause the one or more processors to perform a method comprising:
identifying a plurality of local network interfaces coupled to a bridge module, wherein each local network interface of the plurality of local network interfaces is coupled over one or more networks to one or more remote network interfaces, and
wherein each remote network interface being assigned one or more remote network addresses, and the plurality includes a first local network interface in a promiscuous mode;
determining whether a list of all remote network addresses that are coupled to a subset of local network interfaces of the plurality is known, wherein the subset includes the plurality of local network interfaces excluding the first local network interface; and
when the list of all remote network addresses that are coupled to the subset is determined to be known, disabling the promiscuous mode of the first local network interface and adding all of the remote network addresses that are coupled to the subset to a filtering table that is coupled to the first local network interface.

\* \* \* \* \*